United States Patent [19]

Numata

[11] 4,321,462
[45] Mar. 23, 1982

[54] LIGHT MEASURING DEVICE
[75] Inventor: Saburo Numata, Urawa, Japan
[73] Assignee: Fuji Photo Optical Co., Ltd., Japan
[21] Appl. No.: 96,002
[22] Filed: Nov. 20, 1979
[30] Foreign Application Priority Data Nov. 22, 1978 [JP] Japan .................. 53-144501

[51] Int. Cl.³ ........................... H01J 40/14
[52] U.S. Cl. .................. 250/211 J; 250/578
[58] Field of Search ........... 250/211 J, 214 P, 578;
356/222, 223; 354/24; 357/24

[56] References Cited
U.S. PATENT DOCUMENTS 3,902,812  9/1975  Honkawa ............... 356/223
4,099,885  7/1978  Kawasaki et al. .......... 354/24
4,182,573  1/1980  Yamada et al. ........... 356/222

Primary Examiner—David C. Nelms
Attorney, Agent, or Firm—Eyre, Mann, Lucas & Just

[57] ABSTRACT

A number of photoreceptors are arranged in a matrix along X-lines and Y-lines. An X-direction multiplexer and a Y-direction multiplexer are connected with the X-lines and Y-lines, respectively. Log-conversion amplifiers are connected at the input of the Y-direction multiplexer to log-compress the output of the photoreceptor before it is inputted into the Y-direction multiplexer. All the circuitry including the photoreceptors, multiplexers and amplifiers are deposited on a single chip to make an IC element.

1 Claim, 2 Drawing Figures

LIGHT MEASURING DEVICE

BACKGROUND OF THE INVENTION

1. Field of the Invention

This invention relates to a light measuring device, and more particularly to a device for measuring the intensity of illumination at a number of points on a light receiving surface called Charge Transfer Device.

2. Description of the Prior Art

A charge transfer device called CTD for measuring the intensity of illumination at a number of points on a light receiving surface is heretofor used in a television camera, for instance. In the conventional light measuring device of this kind, a number of photoreceptors are arranged in a matrix and an output signal of a desired photoreceptor can be taken out by designating the code of an X-direction multiplexer and a Y-direction multiplexer.

In general, the brightness of the object which is normally to be photographed by a camera is within the range of $-3$ to 2.0 in terms of EV. Since the brightness changes greatly, the output of the photoreceptor must be log-compressed before used as a contol signal. Therefore, when the CTD is used in a camera, a log-conversion amplifier is usually connected to the output terminal of the Y-direction multiplexer for taking out the output signal of the photoreceptors.

Since the CTD has a number of photoreceptors and X- and Y-direction multiplexers on one chip, the log-conversion amplifiers must be externally connected thereto, which results in increase in the manufacturing cost due to the increased number of assembling steps.

SUMMARY OF THE INVENTION

The primary object of the present invention is to provide a light measuring device including a number of photoreceptors in which the external connection of a log-conversion amplifier is not necessary.

The light measuring device in accordance with the present invention is characterized in that log-conversion amplifiers are inserted between the outputs of the matrix circuitry and Y-direction multiplexers for the outputs so that the output signals of the output lines are sent to the Y-direction multiplexers after log-compressed, and the circuitry including these elements are integrated into an IC circuit on one chip.

DESCRIPTION OF THE PREFERRED EMBODIMENT

Figure 1:
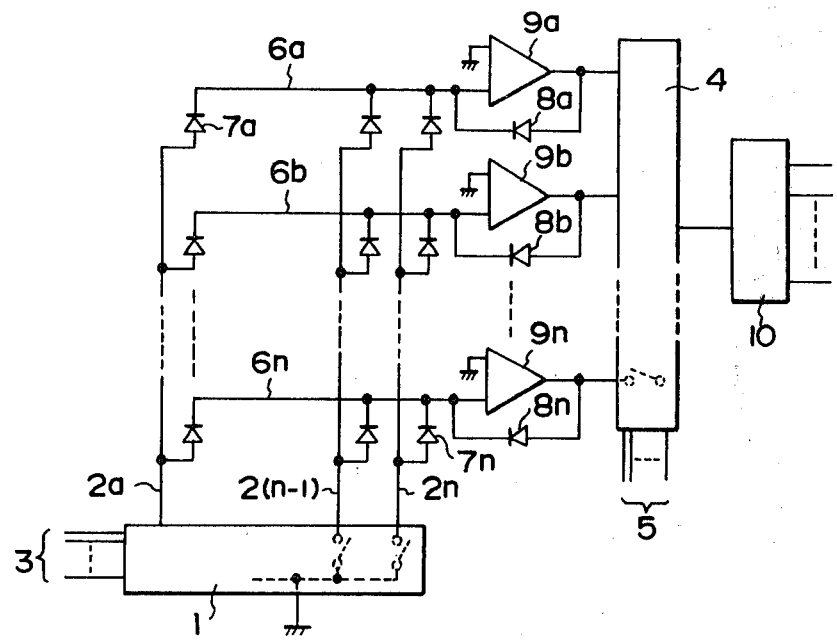
FIG. 1 is a circuit diagram showing an example of the present invention.

Referring to FIG. 1, a plurality of X-lines $2a, 2b, \ldots 2(n-1), 2n$ are connected to the output terminal of an X-direction multiplexer 1. The X-direction multiplexer 1 functions to turn ON a certain X-line in accordance with a code signal input thereto through its select terminal 3 and outputs the inputted signal through its output terminals. In the illustrated embodiment, since the input terminal is grounded, the selected X-line is grounded.

In the circuitry shown in FIG. 1, a Y-direction multiplexer 4 is provided like the X-direction multiplexer 1. The Y-direction multiplexer 4 outputs a selected input signal among a plurality of input signals according to the code signal inputted at its select terminal 5. A plurality of Y-lines $6a, 6b, \ldots 6n$ are connected with the input terminals of the Y-direction multiplexer 4.

A number of photoreceptors $7a, 7b, \ldots 7n$ like silicon blue cells are connected with the Y-lines $6a, \ldots 6n$ and X-lines $2a, \ldots 2n$ to form a matrix circuit.

With said Y-lines are connected log-conversion amplifiers $9a, 9b, \ldots 9n$ each having a log diode $8a, 8b, \ldots 8n$ to log-compress the output of the photoreceptors $7a, 7b \ldots 7n$ before the outputs of the Y-lines are received by the Y-direction multiplexer 4.

The log-converted output voltage of the multiplexer 4 is converted to a digital signal through an A/D converter 10 connected with the outputs of the amplifiers $9a, 9b \ldots 9n$. The coded digital signal thus obtained is sent to an exposure control circuit of a camera.

In the above-described circuitry, the X-direction multiplexer 1, the Y-direction multiplexer 4, photoreceptors $7a \ldots 7n$ and the log-conversion amplifiers $9a \ldots 9n$ are provided on a single chip to form an IC.

Now the operation of the above-described invention will be described. When a code signal is input into the X-direction multiplexer 1 through the select terminal 3, an X-line is selected according to the code signal and only the selected X-line is grounded.

Similarly, at the Y-direction multiplexer 4 a Y-line is selected according to a code signal input thereinto at the select terminal 5. Therefore, the output of the photoreceptor on the selected X-line and Y-line can be taken out through the Y-line multiplexer 4.

The selected photoreceptor determined by the X-line and Y-line generates a photocurrent of the amount corresponding to the amount of incident light. The photocurrent is sent to the A/D converter 10 through the Y-direction multiplexer 4 after log-compressed by the log conversion amplifier connected with the selected Y-line, and it is converted to a digital signal thereby.

Thus, it is possible to measure the intensity of illumination at the photoreceptors by scanning the photoreceptors $7a \ldots 7n$ by use of the X-direction multiplexer 1 and the Y-direction multiplexer 4. By obtaining the arithmetic mean of the outputs of the photoreceptors $7a \ldots 7n$, it is possible to make averaged light measuring. Further, it is also possible to make spot light measuring by taking out the outputs of only the photoreceptors within a small area.

Figure 2:
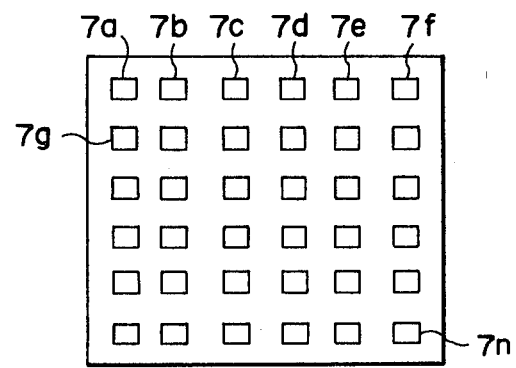
FIG. 2 is a plan view of the light measuring device showing the arrangement of the photoreceptors.

FIG. 2 shows the arrangement of the photoreceptors $7a \ldots 7n$. In the arrangement, the photoreceptors $7a \ldots 7n$ are arranged regularly at equal intervals to measure the intensity of illumination uniformly over a light receiving face.

I claim:

1. A light measuring device comprising a plurality of photoreceptors which are arranged regularly along X-lines and Y-lines in a matrix, an X-direction multiplexer connected with the X-lines, a Y-direction multiplexer connected with the Y-lines, log-conversion amplifiers connected with the Y-lines between the Y-direction multiplexer and the outputs of the Y-lines to log-compress the output of the photo receptors before the output is inputted into the Y-direction multiplexer, means for selectively taking out the output of a desired photoreceptor as a log-compressed output voltage by designating the code of the X-direction multiplexer and the Y-direction multiplexer, and said photoreceptors, said X- and Y-direction multiplexers, and said log-conversion amplifiers being integrated on a single chip as an IC element.

* * * * *